United States Patent [19]

Uhlemayr

[11] Patent Number: 5,639,561
[45] Date of Patent: Jun. 17, 1997

[54] SINGLE-LAYERED PAPER PRODUCT

[75] Inventor: Reinhold Uhlemayr, Rutesheim, Germany

[73] Assignee: Drescher Geschaeftsdrucke GmbH, Rutesheim, Germany

[21] Appl. No.: 349,001

[22] Filed: Oct. 26, 1994

[30] Foreign Application Priority Data

| Sep. 15, 1994 | [DE] | Germany | 44 32 876.1 |
| Sep. 15, 1994 | [DE] | Germany | 44 32 902.4 |
| Sep. 15, 1994 | [DE] | Germany | 44 32 903.2 |

[51] Int. Cl.⁶ .............................. B32B 7/12; B32B 27/10
[52] U.S. Cl. ............... 428/537.5; 428/511; 428/355 EN
[58] Field of Search ..................... 428/537.5, 511, 428/355, 356

[56] References Cited

U.S. PATENT DOCUMENTS

| 3,927,237 | 12/1975 | Sund | 428/536 X |
| 4,109,049 | 8/1978 | Thompson | 428/511 X |
| 4,296,225 | 10/1981 | Rhum | 428/511 X |
| 4,361,452 | 11/1982 | Clarke et al. | 428/511 X |
| 4,720,417 | 1/1988 | Sweeny et al. | 428/537.5 X |
| 4,792,487 | 12/1988 | Schubring et al. | 428/537.5 X |
| 5,120,360 | 6/1992 | Tajiri et al. | 428/537.5 X |
| 5,418,057 | 5/1995 | Tokiyoshi et al. | 428/537.5 X |

OTHER PUBLICATIONS

EP 257545 B1 Abstract.

*Primary Examiner*—Daniel Zirker
*Attorney, Agent, or Firm*—Edward J. Timmer

[57] ABSTRACT

In order to improve the printing capability with high-performance laser printers and the subsequent processing of a single-layered paper article, in particular, a single-sheet mailer having an adhesive coating adapted to be activated for adhering a single layer with itself or with further layers, it is suggested that a component is added to the adhesive coating which can absorb the separating agents used during laser printing and can remove them from the paper surface. According to the invention, additives of oleophilic bentonite and/or polyvinyl alkylether and/or polyethylene glycol are suggested.

12 Claims, No Drawings

SINGLE-LAYERED PAPER PRODUCT

The invention relates to a single-layered paper product, in particular, single-sheet mailers having an adhesive coating adapted to be activated for adhering a single layer with itself or with further layers. The invention relates, in particular, to single-layered paper articles which can be printed with high-performance laser printers and subsequently without intermediate storage after the printing can be folded and bonded to form completed single-sheet mailers or can be manufactured to form a multi-layered paper article, as for example a set of forms or the like.

The laser printable paper articles known up till now which can be bonded to form so-called single-sheet mailers after the printing, show more and more problems when printed by means of laser printers when high-performance laser printers are used in which a very high printing speed is achievable. In such laser printers, it is necessary to increase the temperature at the fixing station, at which the toner material only loosely sticking to the paper at first is fixed to the paper surface, according to the increased throughput of paper or the increased throughput speed of the paper, in order to achieve a sufficient fixation of the toner material to the paper surface in the shorter space of time now available.

On the other hand, in order to prevent that toner material leads to bonding at the fixing station, in particular at the heating roller of the fixing station, it is necessary for a separating agent, which in a plurality of cases contains silicone oil as main component, to act on the fixing roller. At increasing fixing temperatures, a higher amount of separating agent is necessary.

Separating agents, especially silicone oils, however, have particularly strong anti-adhesive effects, i.e. the adhering properties of the adhesive coating of the paper articles printed in the laser printers, are greatly reduced or entirely destroyed or suppressed.

This effect is observed in all current adhesive systems of present single-sheet mailer systems:

a) Adhesive systems making use of remoistenable glues;
b) Adhesive systems making use of self-adhesives adapted to be activated by pressure;
c) Adhesive coating making use of thermoplastic adhesives.

The systems a) and b) are particularly susceptible to interference with respect to silicone oils and already with only small silicone proportions on the surface, a secure closure of the single-sheet mailers can no longer be ensured with these systems.

However, single-sheet mailers are used to an increasing extent for expediently sending information which should only be made accessible to the receiver, so that a secure adhesion, i.e. a secure closure of the single-sheet mailer is of essential importance. In this respect, the following are only mentioned, namely notifications to insurance policy holders from insurances when changing terms of insurance and adjusting insurance premiums; mailing of salary statements; mailing of statements of account from banks, etc.

The problem of the de-activation of the adhesive coatings can be moderated by intermediately storing the printed papers for a certain time. This, however, disturbs the operating process considerably and holds the danger of unauthorized third parties gaining access to confidential information.

The object of the invention is to produce a paper article, in particular, for the use as single-sheet mailer in which, after the paper article is laser printed, a further processing to form a single-sheet mailer, i.e. in particular the bonding of the single-sheet mailer, can result on-line, i.e. without intermediately storing the papers.

This object is accomplished in accordance with the invention with a paper article of the type described in the beginning in that the adhesive coating comprises an oleophilic bentonite proportion of at least 0.1 g/m$^2$ of the coated paper surface.

The references concerning coating weights, as far as nothing else is mentioned, relate to the coating of the completely dried papers made available for the laser printing throughout the entire specification.

The oleophilic bentonite proportion in the adhesive coating according to the invention is sufficient to absorb the separating agent proportions in the adhesive coating and thus to remove them from the surface of the coating, so that a further processing of the papers taking place directly following the laser printing, in particular their bonding to form single-sheet mailers, can result on-line, i.e. without delay. This also applies to adhesive coatings having distinct oleophobic character.

The adhesive coating preferably has a proportion of oleophilic bentonite which results during coating in a coating weight with bentonite of 0.2 to 1.0 g/m$^2$ in relation to a coated paper surface. This quantity is already sufficient to immediately supply paper printed in the laser printer to the adhesion process after the printing.

Greater contents of oleophilic bentonite further improve the absorbing capacity for the separating agent of the laser printer. However, with greater proportions of the oleophilic bentonite in the adhesive coating, in which a coating weight with bentonite of >1.0 g/m$^2$ of the coated paper surface is achieved, greater effects can normally no longer be achieved. On the other hand, higher proportions of oleophilic bentonite are not disturbing.

The object mentioned above is accomplished further in accordance with the invention with a paper article of the type described at the outset in that the adhesive coating comprises a polyvinyl alkylether proportion of at least 0.01 g/m$^2$ of the coated paper surface.

The polyvinyl alkylether proportion in the adhesive coating according to the invention is sufficient to absorb the separating agent proportions in the adhesive coating and thus to remove them from the surface of the coating, so that a further processing of the papers taking place directly following the laser printing, in particular their bonding to form single-sheet mailers, can result on-line, i.e. without delay. This also applies to adhesive coatings having distinct oleophobic character.

In this respect, a property of the polyvinyl alkylethers is used according to which they are in a liquid state at room temperature, however becoming solid at higher temperatures and lower density. In the present case, the polyvinyl alkylether component of the adhesive coating becomes solid when the same is dried (drying temperature, for example, approximately 90° C.) and takes up a certain volume in fine distribution in the adhesive layer. During the drying procedure the adhesive coating solidifies. After the drying procedure is completed, the paper article cools down to ambient temperature again. Thereby, the polyvinyl alkylether component liquifies and simultaneously increases its density. The volume taken up in the drying procedure is only partially needed by the polyvinyl alkylether component at ambient temperature. The remaining volume is available as free capillary volume accessible from the coating surface for the absorption of liquid separating agent of the laser printers. The capillary forces effective in the capillaries additionally provide for an accelerated transportation of the separating agents away from the surface and into the interior of the adhesive layer.

A preferred polyvinyl alkylether is the polyvinyl methylether.

A sufficient absorbing capacity for the separating agent is often observed already when using the polyvinyl alkylether, which corresponds with a coating weight of the dried paper article of approximately 0.01 g/m² of the coated surface.

The best results with respect to the adhesive reliability are achieved with polyvinyl alkylether additives in the range of 0.03 to 0.1 g/m² of the coated paper. Greater amounts of additives are possible, however, but regularly do not have any further advantages.

The object mentioned above is accomplished further in accordance with the invention with a paper article of the type described in the beginning in that the adhesive coating comprises a polyethylene glycol proportion of at least 0.1 g/m² of the coated paper surface.

The polyethylene glycol proportion in the adhesive coating according to the invention is sufficient to absorb the separating agent proportions in the adhesive coating and thus to remove them from the surface of the coating, so that a further processing of the papers taking place directly following the laser printing, in particular their bonding to form single-sheet mailers, can result on-line, i.e. without delay. This also applies to adhesive coatings having distinct oleophobic character.

The polyethylene glycol acts as solvent for the separating agent and simultaneously provides for an improved wettability of the paper surface with separating agent.

Even though a selection can be made from a broad spectrum of polyethylene glycols and a further improvement of the absorption effect for silicone oil and separating agents of the laser printers is generally observed, it is recommended to form the polyethylene glycol proportion of the adhesive coating essentially from two fractions of polyethylene glycol, namely a first polyethylene glycol proportion having a molecular weight $\leq 1000$ and a second polyethylene glycol proportion having a molecular weight $>10,000$.

The preferred ratio of the first polyethylene glycol proportion to the second polyethylene glycol proportion is approximately 2:1 to approximately 1:2, preferably approximately 1:1.

The entire polyethylene glycol proportion is preferably adapted such that in the coated paper there is a coating weight of approximately 0.3 to approximately 1.0 g/m² of polyethylene glycol on the coated surface. Greater polyethylene glycol proportions are possible but as a rule no longer increase the adhesion capability essentially.

To increase the resorption of the laser printer separating agent, polyethylene glycols, in particular, are to be used, their molecular weight being in the range of 30 to 50,000. The effect of the polyethylene glycols during the increase of the absorbing capacity of the surface of the paper article for laser printer separating agents depends on the solubility of the silicone oils in polyethylene glycol.

The effect of the bentonite can still be increased further with silicone-compatible substances in the adhesive coating, whereby polyethylene glycol is preferably mixed in with the adhesive coating. In this respect, polyethylene glycol acts, as already described above, as solvent for the separating agent and facilitates the wettability of the paper surface with separating agents.

The selection of suitable polyethylene glycols results as described above for the use of polyethylene glycols alone. Also the quantities specified above can be applied to the combined use with oleophilic bentonite, however, for the polyethylene glycol a lower bottom limit of 0.1 g/m² results for the preferred range.

However, with the combined application of oleophilic bentonite and polyethylene glycols, not only a cumulative effect is obtained but an effect clearly surpassing that, which is noticeable particularly in view of an accelerated silicone oil absorption and with that the removal of silicone oil proportions at the surface.

The effect of the oleophilic bentonite can additionally be increased by adding polyvinyl alkylethers, in particular, polyvinyl methylethers, which are present as component of the adhesive coating as described above, firstly in solid form during the drying procedure, later however during cooling, they liquify and leave behind capillary channels in the adhesive coating. Since these capillary channels can also absorb the laser printer separating agent themselves, they therefore assist the absorption of the laser printer separating agent as admixture in the matrix bentonite proportions.

With respect to quantities, it is recommended to select the polyvinyl alkylether proportion as admixture to oleophilic bentonite in the adhesive coating such that in the finished adhesive coating, a coating weight of approximately 0.01 to 0.1 g/m² of the coated surface results.

The effect of the polyvinyl alkylether additive and, where applicable, the bentonite proportion can be increased still further with silicone-compatible substances in the adhesive coating, whereby preferably the polyethylene glycols as already described above are added to the adhesive coating. In this respect, polyethylene glycols act as solvents for the separating agent and facilitate the wettability of the paper surface with separating agent.

Even though the three additives mentioned above and added to the adhesive coating adapted for activation show different behaviour characteristics when transporting the silicone proportions away from the surface, they can be combined with each other as desired without interfering with each other, whereby due to the different behaviour mechanisms and properties, synergistic effects are still additionally observed, i.e. the additives of oleophilic bentonite, polyethylene glycols and polyvinyl alkylether assist and promote each other in their behaviour characteristic.

The additives of polyvinyl methylether have a so-called sensitizing effect by means of which a film formation is prevented due to the mass of the adhesive coating. Consequently, the coating remains permeable to water vapour so that during the drying process, plastic proportions of the adhesive coating are not carried along and transported to the surface by means of escaping water vapour. A premature thickening of the adhesive coating masses at the beginning of the drying procedure due to the solidification of the polyvinyl methylether proportions is responsible for this effect.

Furthermore, it is observed in the paper article according to the invention that it is plasticized due to the warming up in the region of the fixing assembly and thereby without causing any interferences, can also be deflected around small radii.

Finally, it is observed that in the paper article according to the invention, the blocking temperature and the sealing temperature can be influenced by varying the proportions of pigments, such that with higher pigment contents, a higher sealing temperature becomes necessary while the tendency to blocking the paper in stacks, i.e. adhesion of paper sheets or the webs over a large area on the roller is reduced by a blocking temperature increased likewise.

In particular, the adhesive system with a thermoplastic polymer material coating as adhesive is preferred as adhesive system. This adhesive coating can be applied to the laser print paper over the entire surface as a coat and unexpectedly leads to a sintering process of the toner material with the paper during printing in the laser printer, this sintering process being acceptable for use on official documents. Additionally, this adhesive coating can be processed in the laser printers without problems, despite the use of the thermoplastic polymer material, and subsequently by using pressure and/or temperature, can be closed to form a secure bonded structure of paper layers lying on top of one another.

Polyvinyl acetate, copolymers of vinyl acetate and ethylene, polyvinyl chloride as well as polyacrylate dispersions are preferred thermoplastic polymer materials for the adhesive. Fundamentally, also other thermoplastic polymer materials could be considered, however, best results with reference to the resistance to interference of the paper during laser printing have been achieved with the polymer materials mentioned above. In particular, the polymer materials mentioned above are suitable as thermoplastic polymer material owing to the high temperatures which prevail at the fixing assembly of the laser printer which is responsible for fixing the toner material to the paper.

As an alternative, moistenable glues adapted to be activated with water according to the invention can, of course, also be used in connection with the present invention, whereby however, such papers are susceptible to the effect of moisture and tend to adhere more easily in a stack.

Moreover, an adhesive coating made of a self-adhesive adapted to be activated by pressure is evidently available as further alternative, whereby this adhesive coating, on the other hand, cannot be handled as easily as the adhesive coating made of thermoplastic polymer material.

Normally, the single-layered paper article is coated on one side with adhesive, in particular, for the production of single-sheet mailers. In this respect, the adhesive coating can be applied in specific areas, for example, at the edges of the paper or also, however, coated over the entire surface when the adhesive areas of the paper have not been established from the beginning and a paper which can be glued in a standard manner is to be produced. The coating over the entire surface is recommended, of course, also when the secondary aspect of the thermoplastic adhesive coating is to be utilized, namely the sintering of the toner material with the paper for achieving a print which is acceptable for use on official documents.

These and further advantages of the invention are explained in more detail in the following on the basis of examples, whereby the quantity references are always parts in the sense of parts by weight.

EXAMPLE 1

3 parts carboxymethylcellulose (WALOCEL C of the company Wolff, Waistode), 3 parts sodium hydroxide, 1 part polyacrylic acid salt, (available from the company Allied Chemicals under the brand name DISPEX), 37.5 parts microtalc (average particle size 10 µm), 62.5 parts calcium carbonate (chemically precipitated), 4 parts calcium stearate and 100 parts oleophilic bentonite (available from the company LaPORTE under the product designation Fulacolor) are mixed slowly in the above-mentioned sequence into 270 parts water and processed for 10 minutes with a homogenizer of the type Ultra Turax (available from the company Janke & Kunkel).

This pigment slurry is slowly mixed with 950 parts polyvinyl acetate dispersion (available from the company Hoechst as Mowillth DC).

The paper surface of an 80 g/m² wood-free paper is coated with 6 g/m² (dry) with the mixture as described above with a coating blade. The paper is dried for 5 minutes at 90° C.

Parallel thereto, a mixture is mixed in which the oleophilic bentonite is omitted.

Both papers are covered with a silicone oil (fuser agent of the company Xerox) with a fine coat.

While the coating according to the invention maintains its full sealing capability, the comparison formula without oleophilic bentonite can no longer be sealed.

The conditions for the sealing test are as follows:

duration of the sealing process 2 seconds sealing temperature 140° C.

sealing pressure 300 Newton/cm²

The sealing capability of a paper directly after the laser printing can also be assessed with the following test without performing a sealing process:

A silicone drop is applied to the paper to be tested and the size of the drop is photographed in the microscope at certain time intervals (for example, 15 seconds). While the drop is quickly absorbed by the coating on a paper sealable after the laser printing, the drop runs on the surface of the paper when the sealing capability is insufficient and the drop appears with a greater radius.

EXAMPLE 2

270 parts water are mixed with 3 parts carboxymethylcellulose (WALOCEL C of the company Wolff, Walsrode), 3 parts sodium hydroxide, 1 part polyacrylic acid salt (available from the company Allied Chemicals under the brand name DISPEX), 75 parts microtalc (average particle size 10 µm), 125 parts calcium carbonate (chemically precipitated) and 4 parts calcium stearate.

The mixture mentioned above is processed for 10 minutes with a homogenizer of the type Ultra Turax (available from the company Janke & Kunkel).

29 parts PEG 400 and 29 parts PEG 20 000 are slowly mixed into this pigment slurry. Subsequently, 950 parts Mowilith DC (Hoechst) are added.

The paper surface of an 80 g/m² wood-free paper is coated with 6 g/m² (dry) with the mixture as described above with a coating blade. The paper is dried for 5 minutes at 90° C.

Parallel thereto, a mixture is mixed in which the polyethylene glycol proportions are omitted.

Both papers are covered with a silicone oil (fuser agent of the company Xerox) with a fine coat.

While the coating according to the invention maintains its full sealing capability, the comparison formula without polyethylene glycol can only be sealed with difficulty.

The conditions for the sealing test correspond with those in Example 1.

EXAMPLE 3

3 parts carboxymethylcellulose (WALOCEL C of the company Wolff, Walsrode), 3 parts sodium hydroxide, 1 part polyacrylic acid salt (available from the company Allied Chemicals under the brand name DISPEX), 75 parts microtalc (average particle size 10 µm), 125 parts calcium carbonate (chemically precipitated) and 4 parts calcium stearate are mixed with 270 parts water.

The mixture mentioned above is processed for 10 minutes with a homogenizer of the type Ultra Turax (available from the company Janke & Kunkel).

20 parts polyvinyl methylether (BASF-Lutonal M40) and 950 parts Mowilith DC (Hoechst) are added to this pigment slurry.

The paper surface of an 80 g/m² wood-free paper is coated with 6 g/m² (dry) with the mixture described above with a coating blade. The paper is dried for 5 minutes at 90° C.

Parallel thereto, a mixture is mixed in which the polyvinyl methylether is omitted.

While the coating according to the invention maintains its full sealing capability, the comparison formula can no longer be sealed without difficulty.

The conditions for the sealing test correspond with those in Example 1.

EXAMPLE 4

270 parts water are mixed with 3 parts carboxymethylcellulose (WALOCEL C of the company Wolff, Walsrode), 3 parts sodium hydroxide, 1 part polyacrylic acid salt (available from Allied Chemicals under the brand name DISPEX), 37.5 parts microtalc (average particle size: 10 μm), 62.5 parts calcium carbonate (chemically precipitated) and 4 parts calcium stearate, 100 parts oleophilic bentonite (available from the company LaPORTE under the product designation FULACOLOR), 29 parts polyethylene glycol (average molecular weight 400), 29 parts polyethylene glycol (average molecular weight 20,000) and thereafter, processed for approximately 10 minutes with a homogenizer of the type ULTRA-TURAX (available from the company Janke & Kunkel).

The pigment slurry obtained in this manner is slowly mixed with 950 parts polyvinyl acetate dispersion (available from the company Hoechst AG as MOWILITH DC).

The paper surface of an 80 g/m² wood-free paper is coated with 6 g/m² (dry) with the mixture produced as described above with a coating blade. The paper is dried for 5 minutes at 90° C.

Parallel thereto, a mixture is mixed in which the 100 parts oleophilic bentonite and the 58 parts by weight of polyethylene glycol are omitted.

Both papers are covered with a silicone oil (fuser agent of the company Xerox) with a fine coat.

While the coating according to the invention maintains its full sealing strength, the comparison formula without oleophilic bentonite and without polyethylene glycol cannot be sealed. The conditions for the sealing test correspond with those in Example 1.

EXAMPLE 5

270 parts water are mixed with 3 part carboxymethylcellulose (WALOCEL C of the company Wolff, Waistode), 3 parts sodium hydroxide, 37.5 parts by weight of microtalc (average particle diameter 10 μm), 62.5 calcium carbonate (chemically precipitated), 4 parts calcium stearate, 2 parts by weight of an optical brightener (available from the company Ciba-Geigy under the trademark TYNOPAL), 90 parts by weight of an oleophilic bentonite (available from the company LaPORTE under the product designation FULACOLOR) and 10 parts by weight of polyvinyl methylether (BASF Lutonal M 40) and subsequently processed for 10 minutes in an ULTRA-TURAX homogenizer. Thereafter, 950 parts by weight of polyvinyl acetate (available from the company Hoechst AG under the designation MOWILITH DC) are slowly mixed. 6 g/m²(dry) of the coating mass are applied with a coating blade to an 80 g/m² wood-free paper. The sheet is dried for 5 minutes at 90° C.

Parallel thereto, a comparitive experiment is undertaken in which the oleophilic bentonite and the polyvinyl methylether are omitted.

Both papers are covered with a silicone oil (fuser agent of the company Xerox) with a fine blade.

While the coating according to the invention maintains its full sealing strength, the comparison formula can no longer be sealed. The sealing process results as in Example 1.

I claim:

1. Paper sheet article useful for laser printing, comprising an adhesive coating on a surface thereof, said adhesive coating being adapted to be activated for adhering the paper sheet with itself or with a neighbouring paper sheet, the improvement which comprises said adhesive coating comprising an oleophilic bentonite proportion of at least 0.1 g/m² of the coated paper surface.

2. Paper article according to claim 1, wherein said adhesive coating comprises a proportion of oleophilic bentonite in the range of 0.2 to 1.0 g/m² of the coated paper surface.

3. Paper article according to claim 1 wherein said adhesive coating contains a thermoplastic polymer material as adhesive.

4. Paper article according to claim 3, wherein said thermoplastic polymer material is selected from the group consisting of polyvinyl acetate, copolymers of vinyl acetate and ethylene, polyvinyl chloride and polyacrylate dispersions.

5. Paper article according to claim 1 wherein said adhesive coating comprises a moistenable glue adapted to be activated with water.

6. Paper article according to claim 1 wherein said adhesive coating comprises a self-adhesive adapted to be activated by pressure.

7. Paper article according to claim 1 wherein said adhesive coating is applied in specific areas.

8. Paper article according to any of claim 1 wherein said the adhesive coating is essentially applied over the entire surface.

9. Paper article according to claim 1, wherein said adhesive coating comprises a proportion of a polyvinyl alkylether. polyvinyl methylether.

10. Paper article according to claim 1, wherein said adhesive coating comprises a proportion of polyethylene glycol.

11. Paper article according to claim 9 wherein the polyvinyl alkylether comprises polyvinyl methylether.

12. Paper article according to claim 1 which comprises a single-sheet mailer.

* * * * *

UNITED STATES PATENT AND TRADEMARK OFFICE
CERTIFICATE OF CORRECTION

PATENT NO. : 5 639 561
DATED : June 17, 1997
INVENTOR(S) : Reinhold UHLEMAYR

It is certified that error appears in the above-indentified patent and that said Letters Patent is hereby corrected as shown below:

Col. 8, line 49; delete "polyvinyl methylether.".

Signed and Sealed this

Twenty-first Day of October 1997

Attest:

BRUCE LEHMAN

Attesting Officer          Commissioner of Patents and Trademarks